United States Patent [19]

Fultz

[11] 4,311,541

[45] Jan. 19, 1982

[54] PANEL AND METHOD FOR THE PREPARATION THEREOF

[75] Inventor: Duane A. Fultz, Westeville, Ohio

[73] Assignee: The Dow Chemical Co., Midland, Mich.

[21] Appl. No.: 220,550

[22] Filed: Dec. 29, 1980

Related U.S. Application Data

[60] Continuation of Ser. No. 72,726, Sep. 4, 1979, abandoned, which is a division of Ser. No. 928,482, Jul. 27, 1978, Pat. No. 4,233,361.

[51] Int. Cl.³ .......................... B29D 27/04; B32B 5/20
[52] U.S. Cl. ..................................... 156/78; 264/45.3; 264/45.4; 264/46.4; 264/DIG. 6; 428/316.6; 428/325; 428/308.4; 428/313.9
[58] Field of Search .................. 264/45.3, 45.4, 48, 264/DIG. 6, 46.4; 156/78; 428/313, 325

[56] References Cited

U.S. PATENT DOCUMENTS

| | | |
|---|---|---|
| 2,421,902 | 6/1947 | Neuschotz . |
| 2,521,190 | 9/1950 | Stafford et al. . |
| 2,639,132 | 5/1953 | Bradford . |
| 2,676,892 | 4/1954 | McLaughlin . |
| 2,797,201 | 6/1957 | Veatch et al. . |
| 2,834,748 | 5/1958 | Bailey et al. . |
| 2,888,410 | 5/1959 | Buchholz . |
| 2,950,261 | 8/1960 | Buchholz . |
| 3,001,954 | 9/1961 | Buchholz . |
| 3,123,856 | 3/1964 | Dye et al. . |
| 3,325,341 | 6/1967 | Shannon ........................... 264/48 X |
| 3,336,184 | 8/1967 | Stastny et al. . |
| 3,551,274 | 12/1970 | Shannon ........................... 264/48 X |
| 3,562,370 | 2/1971 | Shannon ........................... 264/45.3 |
| 3,585,157 | 6/1971 | Beck . |
| 3,592,782 | 7/1971 | Weber et al. . |
| 3,707,414 | 12/1972 | Wismer et al. . |
| 3,806,566 | 4/1974 | Rubens ........................... 264/45.4 |
| 3,842,020 | 10/1974 | Garrett . |
| 4,067,829 | 1/1978 | Garrett . |

FOREIGN PATENT DOCUMENTS 1342341  1/1974  United Kingdom .............. 264/45.4

*Primary Examiner*—Philip Anderson
*Attorney, Agent, or Firm*—R. B. Ingraham

[57] ABSTRACT

Composite foam panels are prepared from expanded thermoplastic particles of low density by generally encapsulating the particles in a phenolic foam matrix and providing a particulate expanded mineral substance such as perlite disposed generally adjacent the major surfaces of the panel.

6 Claims, No Drawings

PANEL AND METHOD FOR THE PREPARATION THEREOF

This is a continuation of application Ser. No. 072,726, filed Sept. 4, 1979, and now abandoned, which is a divisional of application Ser No. 928,482, filed July 27, 1978, and now U.S. Pat. No. 4,233,361.

Thermal insulating panels of a wide variety are well known in the art. Polystyrene foam panels and polyurethane foam panels have been widely used for thermal insulation such as comfort insulation and low temperature insulation. Due to the flammability of such panels, when exposed to intense heat over a period of time, they have been considered less than highly desirable for some applications. Phenolic foams, particularly these prepared from resole resins, have been known for many years but in general have not been highly acceptable for many thermal insulating applications because of their propensity to sorb large quantities of water and the brittleness of the structure. In general in the field of thermal insulation, it is desired to provide a maximum resistance to heat transfer employing a minimum quantity of material. Phenolic foams have been reinforced with a variety of materials including glass fibers, perlite and the like in order to provide structures which are more durable than low density phenolic foams.

It would be desirable if there were a combustion resistant panel suitable for thermal insulation of low density employing relatively low cost components.

It would also be desirable if there were available an improved method for the preparation of synthetic resinous foamed panels having a relatively low tendency to burn on exposure to heat.

It would also be desirable if there were available an improved method for the preparation of such panels which was simple and required minimal apparatus.

These benefits and other advantages in accordance with the present invention are achieved in a composite synthetic resinous foam panel, the foam panel having at least first and second generally opposed major surfaces, the resinous panel comprising a plurality of expanded synthetic resinous thermoplastic particles, the particles having a density of from about one-half to two pounds per cubic foot, the synthetic resinous thermoplastic particles being generally encapsulated within a matrix of a resole resin foam, the resole resin foam having a bulk density in the interstitial spaces between the synthetic resinous particles of from about two to six pounds per cubic foot, an expanded glass in particulate form encapsulated within at least portions of the resole resin foam disposed adjacent the major surfaces of the panel.

Also contemplated within the scope of the present invention is a method for the manufacture of a composite synthetic resinous foam panel having at least first and second major generally parallel surfaces, the steps of the method comprising providing a mold, the mold when in the closed position having at least two major internal surfaces corresponding to the major surfaces of the panel disposed within the mold, disposing on the surfaces of the mold a foamable resole resin composition containing admixed therewith a particulate expanded inorganic glass, disposing within the open mold an expanded particulate synthetic resin mass in the form of a plurality of particles the quantity of expanded synthetic resinous thermoplastic particles being about equal to or up to about twenty percent in excess of the volume of the mold, closing the mold to thereby sandwich the synthetic resinous thermoplastic particles between said two layers of foam forming resole resin composition and partially compressing the synthetic resinous thermoplastic particles, said particles having interstitial spaces therebetween, heating the foaming resole resin composition to a foam forming temperature, the resole resin composition being present in a quantity sufficient that on foaming the resole resinous composition permeates the interstitial spaces between the synthetic resinous particles, the resole resin curing and hardening to form an intergral panel having a density of from about 1.5 to 5 pounds per cubic foot.

Phenolic resins suitable for practice of the present invention are alkaline-catalyzed phenol aldehyde concentration products commonly called one-step resins or "resoles", often referred to as "A" stage of resinification, the "C" stage being the fully cured thermoset resin stage. The resoles are generally liquid and water soluble; they usually contain or consist of from about 3 to 25 percent by weight of water and have viscosities of from about 200,000 to 200 centipoises, at 25° C. Minor amounts of water can be tolerated in the resole resins, although it is preferred that the water content be kept to less than 20 percent by weight of the resole. Advantages are obtained by employing mixtures of two or more of the resole resins, for example, in order to control the initial viscosity. Resole resins or mixtures having a viscosity of from about 300 to 100,000 centipoises at 25° C. when the water content is adjusted to 15 percent by weight water, based on the total weight of water and resin, are preferred.

The resole resins employed in this invention are the reaction products of a phenol and an aldehyde. Usually from about 1.1 to 3 moles of the aldehyde per mole of the phenol (preferably from 1.5 to 2.5 moles of the aldehyde per mole of the phenol) are employed in producing suitable resole resins. Typical of the phenols that are useful in producing suitable resole resins are those represented by the formula

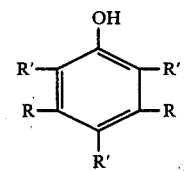

wherein at least two groups represented by R' are hydrogen atoms and the groups represented by R and any remaining group represented by R' are hydrogen atoms or groups which do not impede the condensation of the phenol with an aldehyde (e.g., a substituent such as halogen atom or a hydroxy, alkyl or arly group). Illustrative of suitable phenols are phenol, cresols (particularly m-cresol), xylenols (particularly 3,5-xylenol) and dihydroxybenzenes (particularly resorcinol). Typical of the aldehydes that can be useful in producing suitable resole resins are formaldehyde (including the oligomers and polymers of formaldehyde such as trioxane), furfural, sugars and cellulose hydrolyzates. Such aldehydes can be employed without dilution or dissolved in suitable solvents including aqueous alcohols (e.g., aqueous methanol, n-propanol, isobutanol or n-butanol). The reaction of the phenol and the aldehyde is conducted in the presence of a basic catalyst such as ammonia, sodium hydroxide, potassium hydroxide or barium hydroxide in an amount of from 0.1 to 0.001 mole of catalyst (or preferably from 0.05 to 0.002 moles of catalyst) per mole of the phenol. The resole resin is generally a liquid.

The resole resins used in this invention are usually not highly polymerized so that they are normally liquid and generally water-soluble. This is often referred to as the "A" stage of resinification as distinguished from the "C" stage which is the fully cured thermoset resin stage. As the condensation between the phenol and aldehyde progresses from the liquid low molecular weight resins, the molecular weight of the condensation product increases and the resin exhibits a corresponding increase in viscosity. Advantages are also made of mixtures of several different resole resins in order to control the initial viscosity and reactivity of the foamable compositions. For example, mixtures of a high viscosity and a low viscosity resin have been used to control the ultimate density of the foam. Similarly, a mixture of a liquid and a solid resole can be employed to the same effect. Any resole resin either initially liquid or made fluid by the addition of any agent or by any techniques may be employed in the present invention.

The acids employed as catalysts are the strong inorganic acids such as sulfuric acid, hydrochloric acid, phosphoric acid, nitric acid; i.e., the strong mineral acids, or aqueous solutions of said acids, e.g., a concentrated aqueous solution of hydrochloric acid, or strong oganic acids such as benzene sulfonic acid, toluene sulfonic acid, phenol sulfonic acid, xylene sulfonic acid, $\beta$-naphthalene sulfonic acid and $\alpha$-naphthalene sulfonic acid. Mixtures of any two or more of the acids can also be used.

Oftentimes in order to hasten mixing a surfactant or surface active agent is employed, and beneficially a non-ionic surfactant such as the reaction or condensation product of an alkylene oxide having from 2 to 4 carbon atoms in the molecule with a compound such as higher alkylphenols having from 8 to 12 carbon atoms in the alkyl group, fatty acids having from 12 to 20 carbon atoms and alkyl silanes and silicones. Among suitable surfactants are (a) the polyoxyethylene ethers of alkyl phenols have the general formula

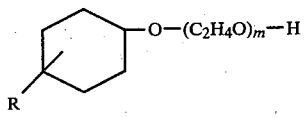

wherein R is an alkyl group having from 8 to 12 carbon atoms and m is an integer from about 8 to 20, (b) ethoxylated caster oil and ethyoxylated hydrogenated castor oil; i.e., the condensation product of said castor oils and from 8 to 20 moles of ethylene oxide per mole of said castor oil, (c) copolymers of ethylene oxide and propylene oxide containing from 8 to 20 moieties of each of said alkylene oxides, and alkyl silane polyoxyalkylene block copolymers similar to those described in U.S. Pat. No. 2,834,748.

Beneficially, the surfactant is the condensation product of ethylene oxide and nonyl phenol having a molecular weight of about 880, or an alkyl silane alkylene oxide block copolymer of the formula

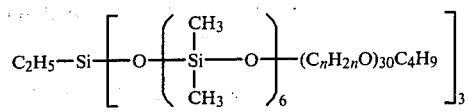

wherein $C_nH_{2n}O$ is a mixed oxyethylene/oxypropylene block of about 17 oxyethylene units and about 13 oxypropylene units.

If desired, suitable fillers are employed with benefit. The fillers may contribute bulking or reinforcement. Suitable fillers are those which are non-reactive or substantially non-reactive with the catalyst or resole resin under conditions of polymerization. Fillers are readily evaluated by prepared resin catalyst mixtures. If the mixture cures, the filler is suitable; if no curing or poor curing is obtained, the filler is unsuitable. Useable fillers include wood flour, carbon black, glass fibers, polyester fibers, polyacrylonitrile fibers, hollow phenolic microspheres, carbon microspheres, fibrous slag, expanded vermiculite, expanded perlite such as is disclosed in U.S. Pat. Nos. 2,421,902; 2,521,190; 2,639,132; hollow inorganic microspheres such as are disclosed in U.S. Pat. No. 2,797,201; foamed clay microspheres such as are set forth in U.S. Pat. No. 2,676,892. The teachings of the foregoing patents are herewith incorporated by reference thereto. Clays, including bentonite, kaolin, attapulgus, expanded vermiculite and non-expanded vermiculite, ceramic foam particles, blast furnaces slag, sand, and non-cellular inorganic material are also employed with benefit.

Accordingly, the amount of acid catalyst can vary widely, depending upon the quantity of acid used to initiate the reaction of the resole. In general, the amount of acid can range from 0.5 to 30 parts per 100 parts of the resole resin, the amount depending upon the strength of the acid. For example, good results are obtained with from 1 to 5 parts of 37 percent hydrochloric acid, or 50 percent sulfuric acid, phosphoric acid or nitric acid. Also, good results are obtained with 3 to 10 parts of benzene sulfonic acid, toluene sulfonic acid, xylene sulfonic acid, or naphthalene sulfonic acid.

Expandable synthetic resinous particles for use in the practice of the present invention are well known and are commercially available. Such particles are widely used for molding or packaging elements, foam plastic cups and other articles. The most common such material is expandable polystyrene generally provided in the form of expandable beads which on heating, usually with steam, expand to form discrete, generally spherical, particles often having diameters from about 1/16 of an inch to about ⅜ of an inch. For the practice of the present invention it is desirable to use expanded synthetic resinous particles, whether they be polymethylmethacrylate, polystyrene or like thermoplastic expanded or foamed particles having expanded diameters not more than about three millimeters. If larger particles are employed, resultant panels show an undesired brittle characteristic and reduces resistance to flame. Smaller size particles are readily employed and the lower size limit is determined by the minimum diameter in which a multicellular bead or particle of a particular foamable composition can be obtained. Such expanded particles are well known and their preparation is disclosed at great length in U.S. Pat. Nos. 2,888,410; 2,950,261, and 3,001,954; the teachings of which are herewith incorporated by reference thereto. Preferably, in the preparation of composite panels in accordance with the present invention, the particles are expanded to a density of about 0.5 to 2 pounds per cubic foot depending upon the physical properties required in the finished panel. The higher the density of the expanded synthetic resinous particles employed in the preparation of the composite panel, the greater will be the load bearing characteristic of such a panel. Usually, in the installation of such panels, they are employed principally for their insulation value and not as working load bearing elements.

In the preparation of panels in accordance with the invention, it is generally desirable for most applications to prepare the panels of a generally rectangular configuration wherein the rectangular panel has two major generally parallel opposed faces and four sides, adjacent sides are disposed at right angles to each other and two adjacent major faces. However, panels of other shapes are readily prepared if a sufficient quantity are desired that warrants the investment in the appropriately shaped molds. Molds suitable for the practice of the present invention generally comprise a first molding platen and a second molding platen which may be disposed in facing relationship and separated by mold sides which are clamped between the platens and define a cavity of the desired shape. Such molds may be prepared from any desired materials. Advantageously, aluminum plate may be employed for the platens and the spacing means fabricated from aluminum channel having a width equal to the desired thickness of the resultant panel. Alternatively, a continuous foam preparation apparatus may be employed such as that disclosed in U.S. Pat. No. 3,123,856 wherein the folds in the kraft paper trough are eliminated. In preparing panels in accordance with the present invention, the resole resin and appropriate filler together with a catalyst and foaming agent are rapidly admixed, applied to the major surface of the mold such as the aluminum plates or to the opposed pieces of kraft paper. Prior to expansion of the foaming resole resin composition, the appropriate amount of expanded resinous particles is supported within the mold on the platen or platen supported paper forming the lower surface of the panel as molded. The upper platen or kraft paper, in the event a continuous process is being used, is then pressed toward the lowermost platen or layer of paper hold foamable resole and the resinous composition heated to a temperature between about 65° and 85° C.; in any event, a temperature sufficiently high to cause foaming and curing of the resole sufficiently low that the synthetic resinous thermoplastic particles are not destroyed by overheating. Desirably, the expanding synthetic resinous particles are free from significant amounts of water. Water is present in the resole resin and the more water in the resole resin the more fluid it becomes and the more readily it foams and preferably is not diluted by excess water carried on the particulate synthetic resinous particles. Advantageously, expanded natural glass such as perlite and a filler such as clay is incorporated within the resole resin to provide improved physical strength, absorb excess water and enhance a lower fire destruction rate of the completed panel. An alternative method of preparing the panel is to admix a foamed glass particle such as perlite, a clay such as kaolin and a 1 to 1 mixture of a catalyst or activator such as toluene sulfonic acid with ethylene glycol in a ratio of about one part of perlite, one part of clay, and one part of the toluene sulfonic acid glycol mixture, all parts being parts by weight unless otherwise designated. The resultant mixture provides a dry granular mix which is readily spread upon one surface of a mold. This can then be covered by resole resin containing the desired quantity of foaming agent and surfactant and in the manufacture of panels up to four inches in thickness an adequate dispersion of the clay expanded glass and catalyst are obtained to permit satisfactory foaming of the resole composition into adjacent mass of particulate synthetic resinous particles. Usually, it is desirable to provide a mold release to prevent adhesion of the finished foamed panels to the mold. A particularly satisfactory method of accomplishing this is to provide a sheet of kraft paper on the molded surfaces which would otherwise contact the resole mixture. After curing of the panel and on removal of the kraft paper, at least in the lower density panels, that is, panels having a density of up to about four pounds per cubic foot, a portion of the hardened resole is removed on removal of the paper leaving a partially open cell surface which provides a desirable amount of tooth or roughness which facilitates the attachment of external skins or faces by means of adhesive compositions. Generally, in the manufacture of panels in accordance with the present invention, blowing agent is employed in a proportion of about 5 parts to about 20 parts blowing agent per 100 parts of resin while clay is generally used at a level of from about 15 parts to about 20 parts, foamed natural glass from 15 parts to about 20 parts, and catalyst usually diluted with ethylene glycol in about a 1 to 1 mixture from about 15 to about 20 parts, and a surfactant from about 0.5 parts to 1.5 parts. The expanded synthetic resinous particles are generally employed at a level of from about 30 to about 70 parts.

By way of further illustration, a plurality of composite panels were prepared employing the following recipe: 100 parts by weight of a resole resin containing 20 weight percent water; 0.92 parts by weight of a silicone surfactant commercially available under the trade designation of DC 193 from The Dow Corning Corporation of Midland, MI; 14.82 parts by weight trichlorotrifluoroethane commercially available under the trade designation Freon 113; 16.66 parts by weight of clay commercially available under the name of Hydrite Flat D; 16.66 parts by weight of perlite available under the trade designation of Chemsil, grade 30; 8.33 parts by weight of ethylene glycol; 8.33 parts by weight toluene sulfonic acid; 49 parts by weight of expanded spherical polystyrene beads, bulk density 0.8 pound per cubic foot, and having a particle diameter of about ⅛ of an inch. An aluminum plate mold was provided having one-half inch thick 24 inch×48 inch aluminum platens. A four-inch wide rectangular spacer ring was provided of aluminum channel. The platens each had two 50-watt strip heaters affixed thereto. The platens remote from the mold cavity were provided with about three inches of thermal insulation and a thermocouple was disposed generally centrally within the mold cavity. All components with the exception of the polystyrene beads were mixed thoroughly and spread onto kraft paper disposed on the platen forming the lower surface of the mold and on the upper platen which was removed from the mold and inverted. The resole resin was spread evenly on each of the platens. The molded cavity was then overfilled with the expanded polystryene particles to about 10 percent. The upper platen of the mold was inverted an placed over the cavity and then the mold heated to a temperature of about 75° over a period of about 10 minutes. At the end of this time, heating was discontinued and the resultant panel removed from the mold and the kraft paper stripped from the surface.

Over a period of several weeks, a number of panels were prepared. Some of the panels were faced with aluminum sheet nominally 0.017 inch in thickness. The facings or aluminum skins were adhered to the foam panels employing the resin and catalyst used to prepare the foams. A variety of physical properties of the unfaced panels were determined and are set forth in the following Table:

TABLE

PHYSICAL PROPERTIES

| | Average | Range |
| --- | --- | --- |
| Density | 2.75 pcf | 1.90 to 3.04 pcf |
| Open cell D-2856C | 39% | 38.3 to 39.7% |
| k factor (75° mean) | .2885 | .26 to .30 |
| Water absorption D-2842 | 19.15% | 16.8 to 21.5% |
| Compress. stren. (@ 5%) | 24.15 psi | 19.8 to 29.8 |
| Compress. modulus | 965 psi | 852 to 1072 |
| Shear stren. C-393 | 19.2 with skins | 17.0 to 21.5 |
| | 35.7 without skins | 31.8 to 39.6 |
| Shear mod. C-393 | 371 with skins | 308 to 435 |
| | 881 without skins | 765 to 997 |
| Tensile stren. C-393 | 14.7 psi | 10.1 to 17.8 |
| Tensile mod. C-393 | 1495 psi | 1161 to 1757 |
| Friability | 4.2% (2 min.) | 1.38 to 8.75 |
| | 15.3% (10 min.) | 5.7 to 21.9 |

The notation "with skins" indicates panels with aluminum facings 0.017 inch in thickness.

In a manner similar to the foregoing, other beneficial panels are prepared which are generally satisfactory for a Class 1 Fire Rating thermally insulating panel.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the manufacture of a composite synthetic resinous foam panel having at least first and second major generally parallel surfaces, the steps of the method comprising providing a mold, the mold when in the closed position having at least two major internal surfaces corresponding to the major surfaces of the panel disposed within the mold, disposing on the surfaces of the mold a foamable resole resin composition containing admixed therewith a particulate expanded inorganic glass, disposing within the open mold an expanded particulate synthetic resin mass in the form of a plurality of particles, the quantity of expanded synthetic resinous thermoplastic particles being about equal to or up to about twenty percent in excess of the volume of the mold, closing the mold to thereby sandwich the synthetic resinous thermoplastic particles between said two layers of foam forming resole resin composition and partially compressing the synthetic resinous thermoplastic particles, said particles having interstitial spaces therebetween, heating the foaming resole resin composition to a foam forming temperature, the resole resin composition being present in a quantity sufficient that on foaming the resole resinous composition permeates the interstitial spaces between the synthetic resinous particles, the resole resin curing and hardening to form an integral panel having a density of from about 1.5 to 5 pounds per cubic foot.

2. The method of claim 1 wherein the expanded synthetic resinous thermoplastic particles are styrene polymer.

3. The method of claim 1 wherein the expanded glass is perlite.

4. The method of claim 1 wherein the synthetic resinous thermoplastic particles have the size of from about 1/16 of an inch to ⅜ of an inch.

5. The method of claim 1 wherein the expanded synthetic resinous thermoplastic particles are styrene polymer, the expanded glass is perlite and the styrene polymer particles have an average diameter of from about 1/16 of an inch to ⅜ of an inch.

6. The method of claim 1 including the step of adhering an aluminum sheet to at least one major surface of the panel.

* * * * *